United States Patent
Ohmae

(10) Patent No.: US 8,424,050 B2
(45) Date of Patent: Apr. 16, 2013

(54) BROADCAST RECEIVING DEVICE

(75) Inventor: Ryosuke Ohmae, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 306 days.

(21) Appl. No.: 12/738,803

(22) PCT Filed: Nov. 28, 2008

(86) PCT No.: PCT/JP2008/071628
§ 371 (c)(1),
(2), (4) Date: Apr. 19, 2010

(87) PCT Pub. No.: WO2009/069737
PCT Pub. Date: Jun. 4, 2009

(65) Prior Publication Data
US 2010/0251315 A1    Sep. 30, 2010

(30) Foreign Application Priority Data

Nov. 30, 2007 (JP) .................................. 2007-310559

(51) Int. Cl.
*H04N 7/173* (2011.01)
(52) U.S. Cl.
USPC ............................ 725/110; 725/116; 709/219
(58) Field of Classification Search .............. 725/44–61, 725/131–134, 139–142; 709/217–232
See application file for complete search history.

(56) References Cited

U.S. PATENT DOCUMENTS

| | | | |
|---|---|---|---|
| 2007/0086459 A1* | 4/2007 | Hirota et al. | 370/390 |
| 2007/0101389 A1 | 5/2007 | Baek | |
| 2007/0104181 A1* | 5/2007 | Lee et al. | 370/352 |
| 2009/0019145 A1* | 1/2009 | Nakanishi et al. | 709/224 |

FOREIGN PATENT DOCUMENTS

| | | |
|---|---|---|
| CN | 1956453 A | 5/2007 |
| JP | 2007-104099 A | 4/2007 |
| JP | 2007-158634 A | 6/2007 |
| JP | 2007-251447 A | 9/2007 |

OTHER PUBLICATIONS

Ikeda et al., "GPON o Mochita IP Hoso Architecture no Kento (IP Broadcasting Architecture over GPON)", IEICE Technical Report, Jun. 8, 2007, vol. 107, No. 91, pp. 5-10.

* cited by examiner

*Primary Examiner* — Annan Shang
(74) *Attorney, Agent, or Firm* — Birch Stewart Kolasch & Birch, LLP

(57) ABSTRACT

It is an object to provide a broadcast receiving device capable of shortening the time from turning-on until display of an IP broadcast. A broadcast receiving device 1, after its start-up, automatically performs setting related to an Internet protocol (IP) including setting of an address of a DNS server and receives an IP broadcast of a specified channel by multicast communication, wherein the broadcast receiving device starts to receive the IP broadcast from an IP broadcast server 53a through an IP network 4 by specifying a multicast address corresponding to the specified channel that is stored beforehand, before completion of the setting of the address of the DNS server.

4 Claims, 5 Drawing Sheets

FIG.5
(A)
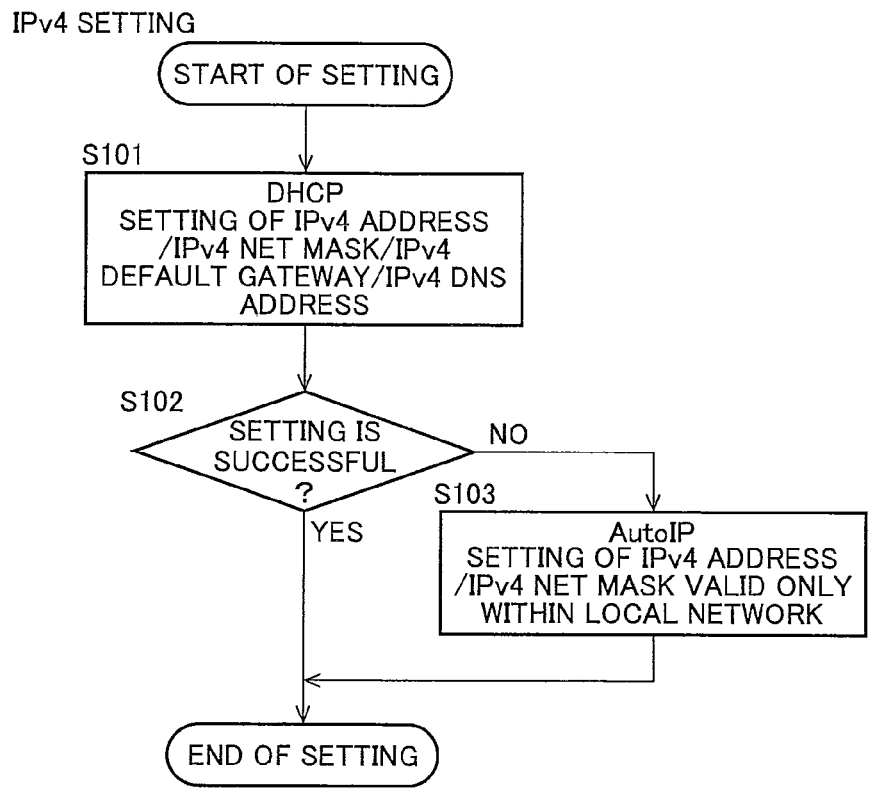
(B)
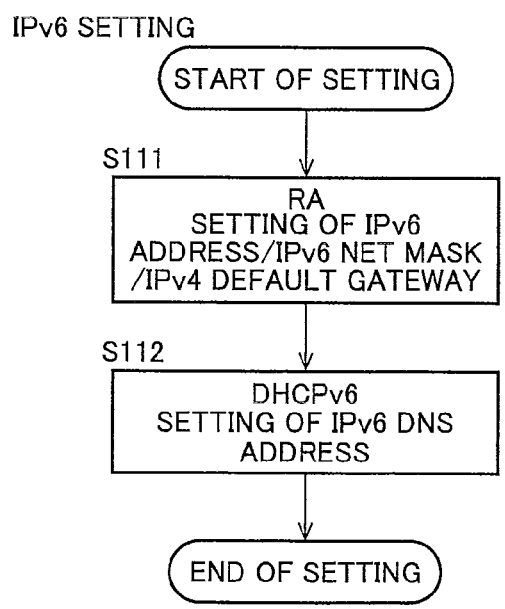

BROADCAST RECEIVING DEVICE

TECHNICAL FIELD

The present invention relates to a broadcast receiving device to receive an IP broadcast.

BACKGROUND OF THE INVENTION

To receive a service using an IP (Internet Protocol), an IP interface is required to be set. Since manual setting of the IP interface is complicated and needs expertise, the IP interface is generally set using a scheme of automatic setting. Four of IP address/net mask/default gateway/DNS (Domain Name Service/Server) are minimally required to be set for utilizing the service that uses the IP. FIG. 5 is an explanatory diagram of a general method of automatically setting an IP interface in a personal computer (PC), etc.

In IPv4 (Internet Protocol version 4), these four are set using DHCP (Dynamic Host Configuration Protocol) as shown in FIG. 5(A) (step S101). Even in the case of failure of such setting (step S102: NO), to enable reception of the service within a local network, setting is made by AutoIP (APIP: Automatic Private IP Addressing) to assign the IP address/net mask valid only within the local network (step S103).

On the other hand, in IPv6 (Internet Protocol version 6), the IP address/net mask/default gateway are set by RA (Router Advertisement) (step S111) and the DNS address is set by DHCPv6 (Dynamic Host Configuration Protocol for IPv6) (step 112) as shown in FIG. 5(B) (while the IP address, etc., may be set by the DHCPv6, it is a general practice to use the RA for the address).

Recently, in accordance with broadbandization of the network, an IP broadcast is proposed as a service using the IP (Internet Protocol). What is generally known as a broadcast receiving device used for the IP broadcast is a special device such as a STB (Set Top Box), by way of which a user may view and listen to contents on a general television receiver (TV receiver). The television receiver and a recorder incorporating the broadcast receiving device for the IP broadcast are proposed as well.

Since the IP broadcast uses a scheme of an IP multicast and the IPv6 is optimum for multicast communication, the IPv6 is used in the broadcast receiving device for the IP broadcast.

DISCLOSURE OF THE INVENTION

Problems to be Solved by the Invention

In the case of the PC, etc, which have a startup screen, the network setting (interface setting) itself may be put off. In the case of the television receiver, etc., however, since some image must be displayed immediately when they are started up to receive/display the IP broadcast, the network setting is indispensable at the time of start-up. For this reason, as shown in FIG. 6, a conventional television receiver starts the automatic setting of the IP interface after it is turned on, and performs the setting by the RA (step S121) followed by the setting by the DHCP (step S122) as described above. Then, after finishing of all settings of the IP interface, the conventional television receiver receives the IP broadcast, causing the IP broadcast service to be started.

This scheme of automatic setting, however, often takes much time until completion of the setting because of the flow that is "a started-up device sends a setting request by way of the interface, waits for a timeout, and receives a reply, and then, the setting is completed". In particular, for the television receiver, the time from turning-on until appearance of the image is very important and in a serious effort to shorten the time by milliseconds, this waiting time is a big problem.

The present invention was conceived in light of the above situation and the object of the present invention is to provide a broadcast receiving device capable of shortening the time from turning-on until display of an IP broadcast.

Means for Solving the Problems

In order to solve the above problems, a first technical means of the present invention is a broadcast receiving device that, after its start-up, automatically performs setting related to an Internet protocol including setting of an address of a DNS server and receives an IP broadcast of a specified channel by multicast communication, wherein reception of the IP broadcast is started by specifying a multicast address corresponding to the specified channel that is stored beforehand, before completion of the setting of the address of the DNS server.

A second technical means of the present invention is a broadcast receiving device that, after its start-up, automatically performs setting related to an Internet protocol including setting of an address of a DNS server and receives an IP broadcast of a specified channel by multicast communication, wherein reception of the IP broadcast is started by specifying a multicast address corresponding to the specified channel that is stored beforehand in parallel with the setting of the address of the DNS server.

A third technical means of the present invention is the broadcast receiving device, wherein a channel search is performed at the time of first reception of the IP broadcast and the multicast addresses are stored beforehand in correspondence to the channels.

Effect of the Invention

According to the present invention, the time may be shortened from turning-on of power until display of an IP broadcast.

BRIEF DESCRIPTION OF THE DRAWINGS

FIG. 5 is a flowchart for illustrating a method of setting an IP interface in a conventional PC, etc.

EXPLANATIONS OF REFERENCE NUMERALS

1 . . . television receiver, 2 . . . remote control, 3 . . . router, 4 . . . IP network, 5 . . . CDN, 6 . . . LAN, 10 . . . broadcast receiving device, 11 . . . network I/F, 12 . . . IP broadcast tuner portion, 13 . . . tuning portion, 14 . . . DMUX, 15 . . . AV decoding portion, 16 . . . output converting portion, 17 . . . CPU, 18 . . . RAM, 19 . . . nonvolatile memory, 20 . . . remote control light receiving portion, 21 . . . communication control portion, 30 . . . display device, 40 . . . speaker, 51, 52 . . . PF, 53a . . . IP broadcast server, 53b . . . portal server

PREFERRED EMBODIMENTS OF THE INVENTION

A broadcast receiving device according to the present invention is an device capable of receiving an IP broadcast and preferentially applicable to a television receiver incorporating a display device and also applicable to other various devices such as a recorder. In this specification, the broadcast receiving device according to the present invention will be described using the example of its application to the television receiver incorporating the display device.

Figure 1:
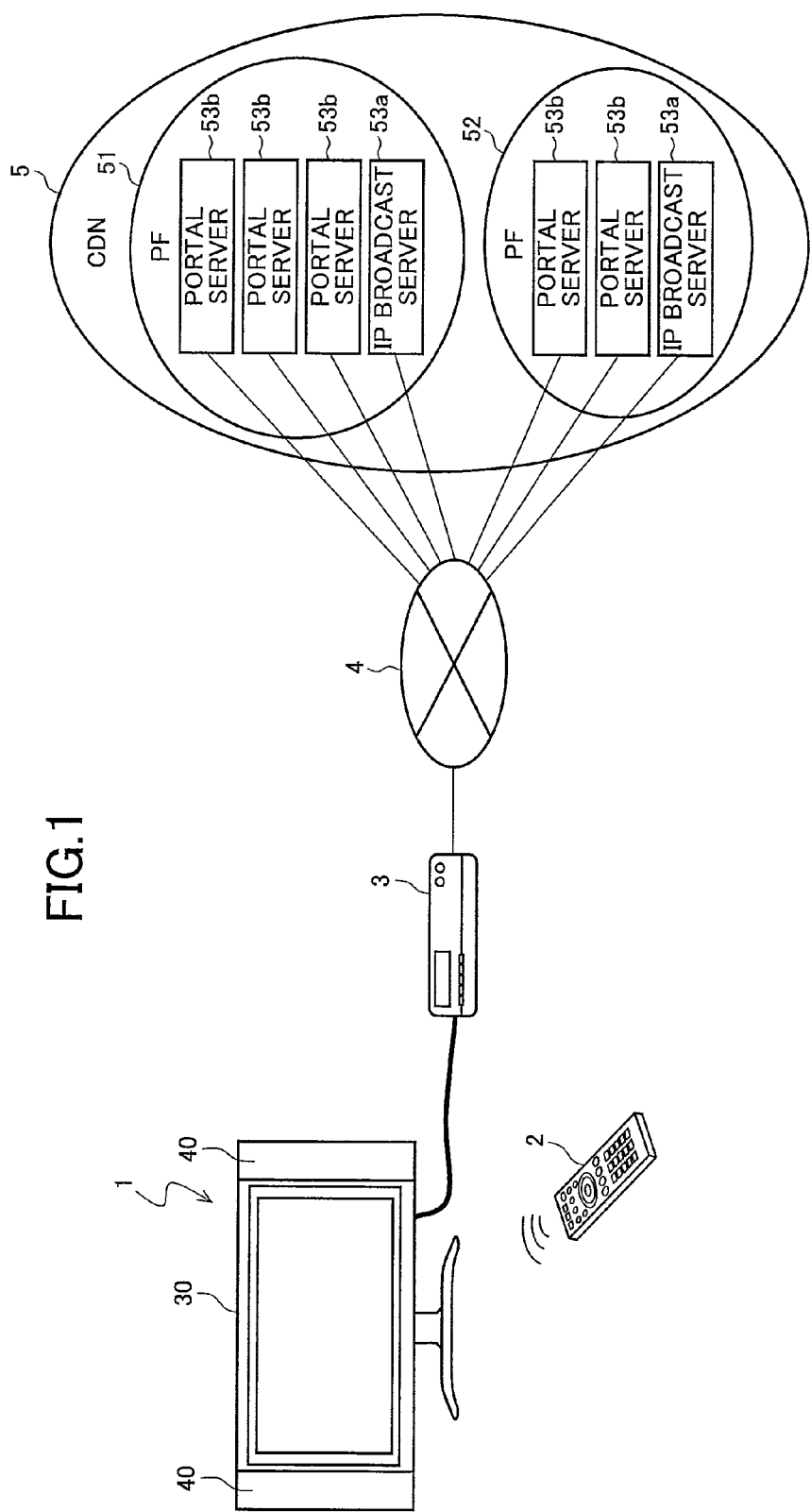
FIG. 1 is a schematic diagram of one example of a configuration of an IP broadcast system incorporating a television receiver to which a broadcast receiving device of the present invention is applied.
Figure 2:
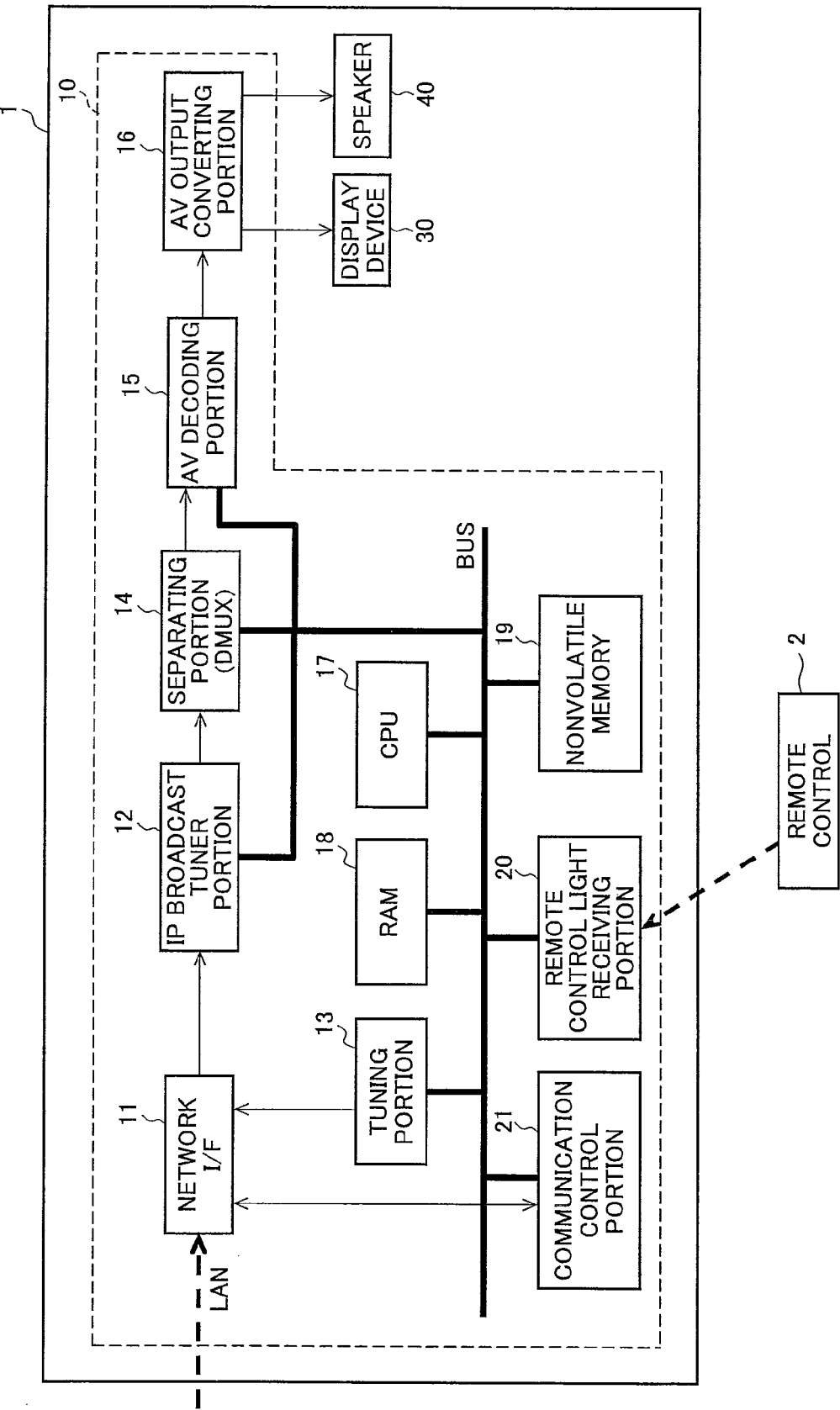
FIG. 2 is a block diagram of one example of a configuration of the television receiver of FIG. 1.

FIG. 1 is a schematic diagram of one example of a configuration of an IP broadcast system incorporating the television receiver to which the broadcast receiving device of the present invention is applied. FIG. 2 is a block diagram of one example of a configuration of the television receiver of FIG. 1. Description will be made on the assumption that this television receiver employs IPv6 as an IP in all communications.

The IP broadcast system, for example, as shown in FIG. 1, includes a television receiver 1 that has a display device 30 and a speaker 40 and is operated by a user by way of a remote control 2 and a router 3, wherein a CDN (Contents Delivery Network) 5 is connected to the television receiver 1 by way of the router 3 and an IP network 4. This CDN 5 is composed of PFs (Platforms) 51 and 52 that are a group of distributors, each of the PFs 51 and 52 includes an IP broadcast server 53a and a portal server 53b, and each of the IP broadcast server 53a and the portal server 53b is connected to the IP network 4.

The IP Broadcast server 53a is a server device to broadcast the IP broadcast and outputs broadcast data to the IP network 4, with a multicast address differing from one channel to another, according to RTP (Real-time Transfer Protocol). As described later, UDP (User Datagram Protocol) is used for the transport layer in the case of the RTP. The television receiver 1 receives the IP broadcast from the IP broadcast server 53a by way of the router 3 and reproduces it using the display device 30 and the speaker 40.

Upon reception of a site information transmit request from the television receiver 1, the portal server 53b provides the site information in XML format or HTML format. For example, HTTP (Hypertext Transfer Protocol) is used as a communication protocol for such occasion. The site information means the information necessary for displaying the site for a service provided by the portal server 53b (e.g., the site for giving guidance of, and signing up for, an IPTV service including the IP broadcast) by means of a Web browser.

The CDN includes, in addition to the above servers, a server storing CDN configuration information to be described later and a server storing PF configuration information to be described later. These servers may be integrated with each other as one server or may be integrated with the IP broadcast server 53a or the portal server 53b as one server. The CDN configuration information and the PF configuration information are, for example, metadata described in the XML format, are transmitted by the HTTP from the corresponding servers, and are used for an after-mentioned channel search, etc., in the television receiver 1 that receives such information.

A basic configuration of the television receiver 1 will then be described.

As shown in FIG. 2, in order to receive the IP broadcast, the television receiver 1 is connected to, for example, a LAN (Local Area Network) 6 and includes a network interface (network I/F) 11 that receives a UDP packet of the IP broadcast from the IP broadcast server 53a by way of the LAN 6, an IP broadcast tuner portion 12 that converts the IP broadcast received in the UDP packet by way of the network I/F 11 to a TS packet, and a tuning portion 13 to be described later.

Tuning processing of the IP broadcast in the tuning portion 13 that performs tuning (selection of station) is performed by specifying a multicast address corresponding to an IP broadcast channel selected by the user out of a group of multicast addresses and transmitting it to the network I/F 11. The network I/F 11 operates at the multicast address set by the tuning portion 13, receives a network stream (UDP packet) being broadcasted and transmits it to the IP broadcast tuner portion 12. The IP broadcast tuner portion 12 converts the network stream to the TS packet and outputs it to a DMUX 14 to be described later as a video/audio stream or an SI (Service Information)-dedicated stream. Like this, whichever in video/audio stream or in the SI-dedicated stream, the tuning operation of the IP broadcast in the tuning portion 13 is performed by setting the multicast address to the network I/F 11.

The television receiver 1 further includes a separating portion (DMUX: Demultiplexer) 14 that performs extraction of program data from the IP broadcast stream and separation of demodulated data, an AV decoding portion 15 that decodes separated video data and audio data of the IP broadcast to a video signal and an audio signal, respectively, and an AV output converting portion 16 that converts the video signal and the audio signal to those for outputting.

The broadcast receiving device 10 further includes a CPU 17 that executes control of the broadcast receiving device 10 as a whole and a RAM 18 that is a semiconductor memory capable of reading and writing by specifying an arbitrary address, and serves as a working area of the CPU 17 to read out a program stored in a nonvolatile memory and temporarily stores the data under processing. The broadcast receiving device 10 also includes a rewritable, nonvolatile memory 19 that stores a control program for performing the control of the broadcast receiving device 10 as a whole and various pieces of information such as setting information for communication.

In the television receiver 1, the broadcast receiving device 10 is connected to the display device 30 such as a liquid-crystal display device and the speaker 40 for audio outputting. The display device 30 displays the image based on the video signal output from the AV output converting portion 16, and the speaker 40 outputs the audio based on an output signal output from the AV output converting portion 16.

The remote control 2 is provided with, for example, a power button for operating the on/off of the power of the television receiver 1, a channel selection button for performing operation of selecting a channel number, a channel up/down button for selecting the channel number by operating it upward or downward, a menu screen display button for performing operation of displaying the menu screen for various settings of the television receiver 1, and a shift/decision button for performing operation of shifting a cursor position right or left, up or down, at the time of setting the menu, etc., and operation of making decision. The remote control 2 generates an operational signal with depression of a provided button and transmits the operational signal to a remote control light receiving portion 20.

The television receiver 1 includes the remote control light receiving portion 20 that receives the operational signal from the remote control 2 operated by the user. Upon reception of the operational signal from the remote control light receiving portion 20, the CPU 17 controls each portion inside the television receiver 1 so as to execute the operation according to a current operating state of the television receiver 1.

Such a configuration enables the television receiver 1 to receive the IP broadcast and display or otherwise reproduce the received IP broadcast.

The television receiver 1 includes a communication control portion 21 that controls the communication by way of the network I/F 11. The communication control portion 21 is used for UDP/IP communication for the IP broadcast and is also used for the communication for making the setting that enables such communication for the IP broadcast.

The processing performed at the time of the start-up of the television receiver 1 will then be described that is a feature of the present invention.

While the IP broadcast is one example of the IPTV service and a VOD (Video On Demand) service and a portal service are also included in the IPTV service, the IP broadcast is the basic service for the television receiver. The IP broadcast uses the scheme of the multicast of the IPv6.

With respect to processing/procedure for receiving the IP broadcast using the IPv6 (e.g., a subscription contract and a channel search to be described later) in the television receiver 1, all of the IP address/net mask/default gateway/DNS address are required to be set as the IP interface setting. However, the television receiver 1 is capable of starting to receive the service only with the IP address/net mask/default gateway if it has finished up to the channel search and is already in a receivable state since the multicast address corresponding to the channel of the IP broadcast is stored in the television receiver 1.

Figure 3:
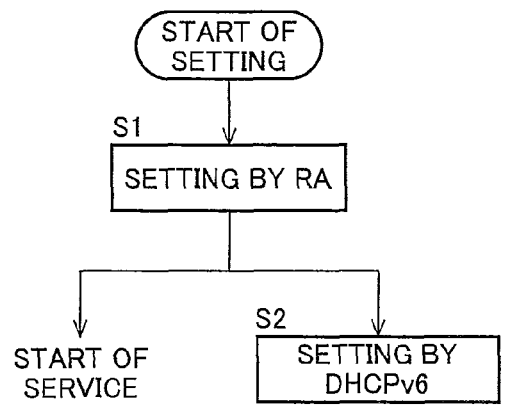
FIG. 3 is a diagram for illustrating the processing at the time of a start-up in the television receiver of FIG. 1.

The television receiver 1 operates as shown in FIG. 3 at the time of its start-up. Upon detection of the depression of the power button of the remote control 2 or the power button, etc., provided on the front of the display device when the television receiver 1 is in a power-off state, the television receiver 1 judges itself to be started up and starts to set the IP interface for the service using the IP. After starting, the television receiver 1 controls the communication control portion 21 and the network I/F 11 so as to receive the RA from a router (server having a router function) connected to the LAN using a neighbor discovery function of ICMPv6 (Internet Control Message Protocol for IPv6), sets the IP address/net mask/default gateway based on the RA (step S1), and stores them in a memory of the communication control portion 21 or the nonvolatile memory 19.

Before completion of the setting of the DNS address (before or in the process of the setting of the DNS address), the television receiver 1, using the tuning portion 13, specifies the multicast address corresponding to a specified channel, namely, the multicast address corresponding to the IP broadcast channel selected by the user or the one at the previous power-off time, out of a group of multicast addresses already stored in the nonvolatile memory 19 by the channel search, and sets the specified multicast address to the network I/F 11. The method for storing the multicast addresses corresponding to the IP broadcast channels will be described later.

By the IP address/net mask/default gateway set at step S1 and the above multicast address, the network I/F 11 receives the stream being broadcasted. Like this, the television receiver 1 is capable of starting the IP broadcast service.

While the television receiver 1 sets the DNS address by the DHCPv6 and stores it in the memory of the communication control portion 21 or the nonvolatile memory 19 (step S2), this setting is performed in the background of the IP broadcast reception/display processing. Arranging like this makes it possible to considerably shorten the time from the power-on until the start of the service that is observed by a user.

Figure 4:
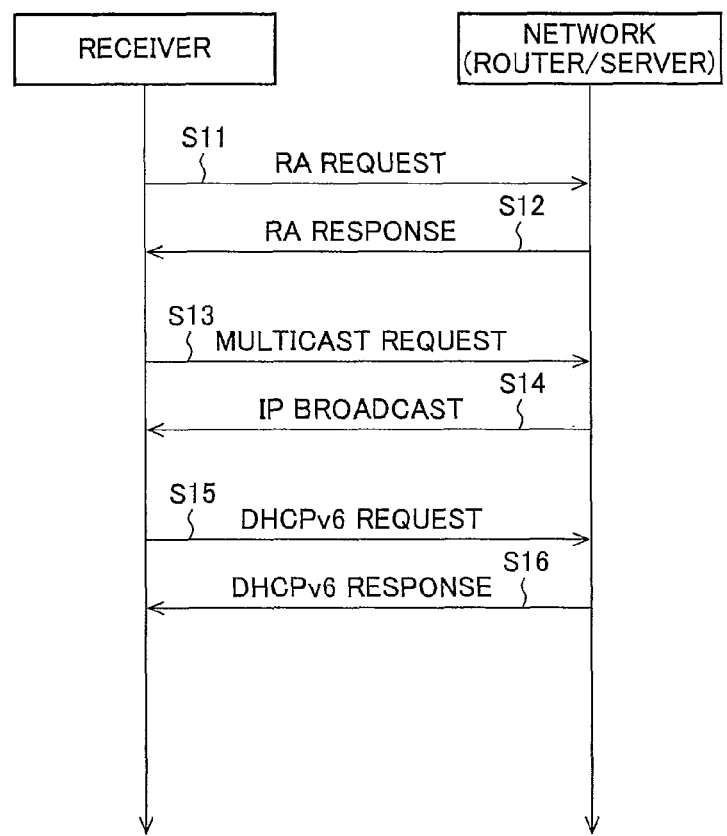
FIG. 4 is a diagram for illustrating the information and messages exchanged between the television receiver and a router at the time of starting up the television receiver of FIG. 1 and the processing performed at the router at that time.
Figure 6:
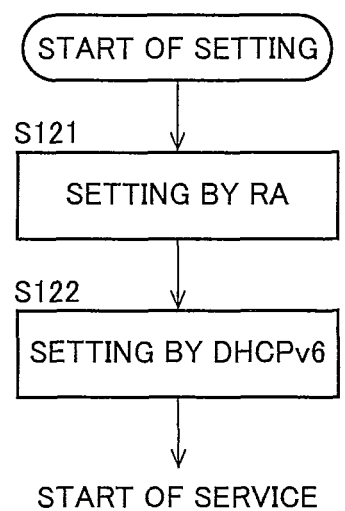
FIG. 6 is a flowchart for illustrating the processing at the time of the start-up in a conventional television receiver.

The information and messages exchanged between the television receiver 1 and the router and the processing performed at the router at the time of starting up the television receiver 1 will be described with reference to FIG. 4.

The started-up television receiver 1 controls the communication control portion 21 and the network I/F 11 so as to send an RA request (router solicitation message) that requests for the RA by specifying a link-local multicast address in order to search for the router within the link (step S11). In response to the router solicitation message, the router sends the RA (message) (step S12). The RA contains, for example, information of a network prefix and the IP address of the router as a sending source. In this example, based on, for example, the network prefix information, etc, the television receiver 1 sets the net mask as well as a link-local unicast address and a global unicast address (IP address) and sets the IP address of the router as a sending source of the RA as the default gateway.

The television receiver 1 sends to the router as the sending source of the RA a multicast request indicating the multicast address corresponding to the channel of the IP broadcast to receive by means of MLD (Multicast Listener Discovery) protocol (S13). Based on the multicast request, the router receives the IP packet sent from the server and duplicates the IP packet. The router then sends the IP packet to a group of the multicast addresses specified by the television receiver 1 (S14). This enables the television receiver 1 to receive the IP broadcast from the server according to the multicast address, and it means that the IP broadcast is started.

The television receiver 1 sends a DHCPv6 request by specifying the link-local multicast address in order to set the DNS address, with the same timing as that of making the multicast request at S13 (S15). At this moment, the router, if provided with a DHCPv6 server function, replies (sends) a DHCPv6 response. The DNS address is indicated in the DHCPv6 response and the television receiver 1 is capable of setting the DNS address based on this.

As described above, after three settings of the IP address/net mask/default gateway as the setting of the IP interface are finished, the television receiver 1, using the multicast address acquired by the channel search, starts to receive the IP broadcast without waiting for completion of the setting of the DNS address and therefore, the time may be shortened from the start-up till display of the image.

The channel search will hereinafter be described.

A procedure called the channel search is taken at the time of installing/setting the television receiver 1 (i.e., before first reception of the IP broadcast by the television receiver 1) in order to view the IP broadcast. The processing for the channel search is equivalent to that for a channel search that tunes the frequency to the channel in a general analog broadcast or digital. Since all settings of the IP interface must be finished and both of the IP address and the DNS address must be ready in order to perform a sequence of channel search, the television receiver 1 sets the IP interface before the channel search, for example, in the same manner as by the conventional method shown in FIG. 5(B).

In the channel search, the television receiver 1 firstly controls the communication control portion 21 and the network I/F 11 so as to acquire the CDN configuration information from a server which stores that CDN configuration information (CDN configuration information storing server). The CDN configuration information indicates the information of a server from which PF configuration information to be described later may be acquired (PF configuration information storing server) and is composed of, for example, metadata described in the XML. The server from which the CDN configuration information may be acquired has its URI (Uniform Resource Identifier) fixedly specified by the URL (Uniform Resource Locator) and the television receiver 1 stores the URL of this server beforehand (e.g., at the time of product shipment). The television receiver 1 acquires the IP address of the CDN configuration information storing server by a DNS lookup based on this URL and accesses the CDN configuration information storing server to acquire the CDN configuration information based on the acquired IP address. The HTTP is used as a communication protocol at the time of such acquisition.

Since the CDN configuration information indicates the URI specified by the URL as the information of the PF configuration information storing server, the television receiver 1 acquires the IP address of the PF configuration information storing server by the DNS lookup based on the URL of the PF configuration information storing server. Based on the acquired IP address, the television receiver 1 accesses the PF configuration information storing server to acquire the PF configuration information. The PF configuration information is the information which indicates what the PFs making up the CDN are like and how each PF is formed, and is composed of, for example, the metadata described in the XML. The PF configuration information also indicates the multicast address of the SI-dedicated stream to be described later. The HTTP is used as the communication protocol at the time of acquisition of the PF configuration information as well.

The television receiver 1 specifies the multicast address described in the PF configuration information to the network I/F 11 to receive the multicast stream for SI only. Reception of this multicast stream for SI only makes it possible to acquire the information of the IP broadcast services provided by all PFs (multicast addresses, channel numbers, etc.). The television receiver 1 records the acquired information as channel data in the nonvolatile memory (VMRAM) 19 so that the channel numbers may correspond to the multicast addresses in the same manner as the channel numbers correspond to the frequencies in the broadcast by radio waves. The television receiver 1 receives the IP broadcast service by reading out such channel data.

As described above, all IP settings must be finished and both of the IP address and the DNS address must be ready before the channel search is performed. Results of the channel search, which are recorded in the nonvolatile memory (NVRAM: Non-Volatile RAM) 19, may be used even if the power is once turned off. Since the multicast address is acquired as live address data that does not need the DNS lookup, the DNS lookup is not necessary for receiving the IP broadcast after the channel search. The channel search is performed only at the time of firstly receiving the IP broadcast and thereafter is renewed automatically and periodically, but is not required immediately after the start-up. The television receiver 1 receives the IP broadcast service, using only the channel data stored in the nonvolatile memory 19.

Therefore, to display a moving image immediately after the start-up, the DNS setting is not required but it is sufficient if the setting of the IP address is finished.

In home electric appliances, it is required that the service is instantaneously ready for use immediately after the turning-on of the power and at the same time, the request for the start-up time (time from turning-on of power until start of reception of service) is severe. Since the network service is a scheme of sending a request and waiting for a timeout and an instantaneous response of the server may not be expected, however, time of several seconds or more may possibly be wasted for the DNS address acquiring processing. Being capable of omitting even one piece of processing required until reception of the service is of great significance.

Supplemental description will now be given of the timing of transmitting the multicast request for reception of the IP broadcast (Join stat timing) and the timing of setting the DNS server address (DHCP).

In a system not premising completion of the DNS server address setting for the start of the Join as described above, the television receiver 1 may start the DHCP before the Join, start the Join without the premise of completion of the DHCP processing, and process the Join and the DHCP in parallel. In the case of processing the Join before the start of the DHCP, the television receiver 1 may start the DHCP after completion of the Join or may process the DHCP in parallel with the Join without waiting for completion of the Join processing. If the parallel processing is enabled, the starting times of each processing for the Join and the DHCP may be made variable depending on the state of the network or other factors.

The invention claimed is:

1. A broadcast receiving device that, after its start-up, automatically performs setting related to an Internet protocol including setting of an address of a DNS server and receives an IP broadcast of a specified channel by multicast communication, wherein
reception of the IP broadcast is started by specifying a multicast address corresponding to the specified channel that is stored in the broadcast receiving device beforehand, before completion of the setting of the address of the DNS server.

2. A broadcast receiving device that, after its start-up, automatically performs setting related to an Internet protocol including setting of an address of a DNS server and receives an IP broadcast of a specified channel by multicast communication, wherein
reception of the IP broadcast is started by specifying a multicast address corresponding to the specified channel that is stored beforehand in parallel with the setting of the address of the DNS server.

3. The broadcast receiving device as defined in claim 1, wherein
a channel search is performed at the time of first reception of the IP broadcast and the multicast addresses are stored beforehand in correspondence to the channels.

4. The broadcast receiving device as defined in claim 2, wherein
a channel search is performed at the time of first reception of the IP broadcast and the multicast addresses are stored beforehand in correspondence to the channels.

* * * * *